Feb. 9, 1954 G. R. GOODWIN 2,668,325
INJECTION MOLDING MACHINE
Filed March 18, 1952 2 Sheets-Sheet 1

Inventor
George R. Goodwin
by Wright Brown Quinby
+May
Attys.

Feb. 9, 1954 G. R. GOODWIN 2,668,325
INJECTION MOLDING MACHINE
Filed March 18, 1952 2 Sheets-Sheet 2
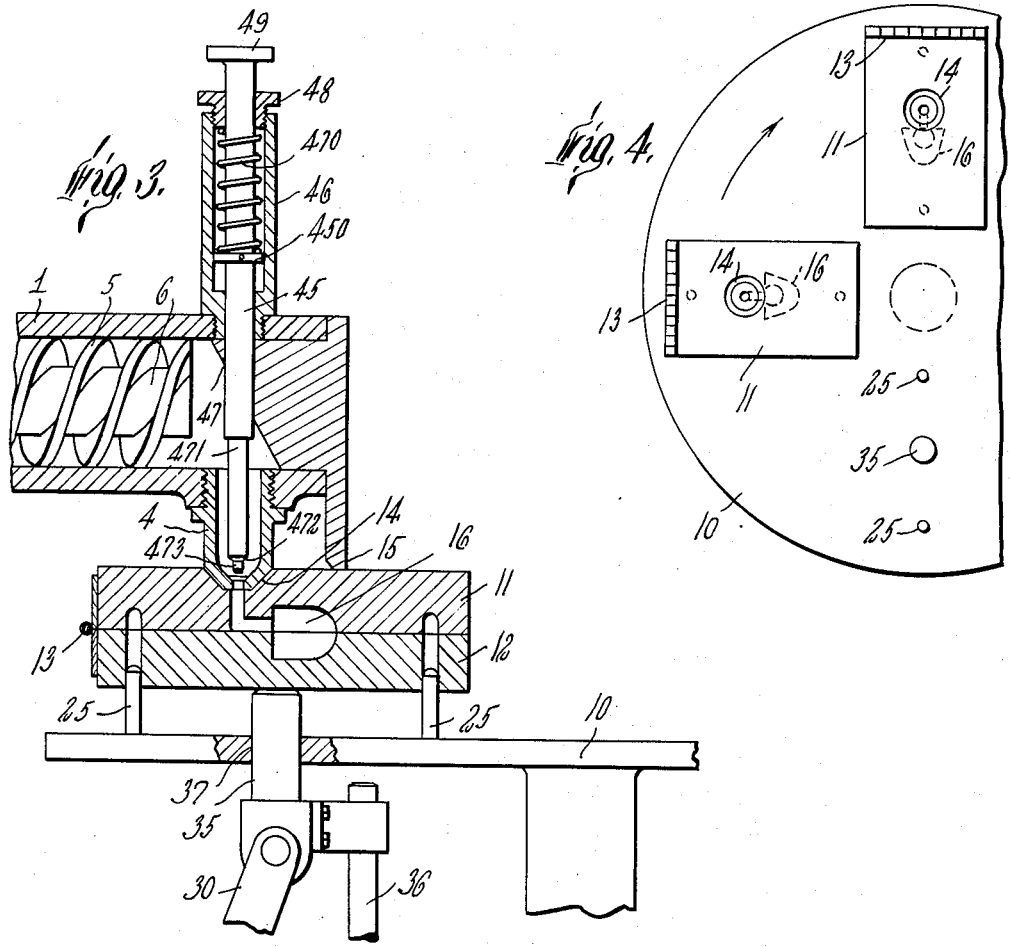
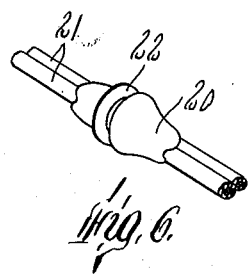
Inventor
George R. Goodwin
by Wright Brown Quinby & May
Attys.

Patented Feb. 9, 1954

2,668,325

UNITED STATES PATENT OFFICE 2,668,325

INJECTION MOLDING MACHINE

George R. Goodwin, Seekonk, Mass., assignor to Miller Electric Co., Pawtucket, R. I., a corporation of Rhode Island Application March 18, 1952, Serial No. 277,118

8 Claims. (Cl. 18—30)

This machine relates to extrusion molding and has for an object to provide an apparatus for molding articles as from heat softenable plastic which may have inserts therein, expeditiously and at low cost.

A further object is to provide for prompt removal of the mold and contents after completion of the molding operation while insuring against the escape of the material being molded from the extrusion press until another mold has been presented thereto.

Still another object is to provide against the plastic oozing out from the molding mechanism between molding operations and becoming cool and hardened so as to interfere with the filling of the molds, or to enter the molds in hardened condition and cause blemishes in the finished pieces.

Still another object is to provide a simple and effective cycle of operations which may be made more or less automatic as desired.

A further object is to provide a cycle of operations which requires only simple controls including only a single direction motor.

For a complete understanding of this invention reference may be had to the accompanying drawings in which Figure 1 is a somewhat diagrammatic side elevation of a molding machine embodying the invention.

Figure 3 is a fragmentary vertical sectional view through the extrusion press and a mold and related parts.

Figure 4 is a detail sectional view on line 4—4 of Figure 1.

Figures 5 and 6 are perspective views showing certain parts adapted to be molded by the machine in accordance with its cycle of operations.

Figure 1:
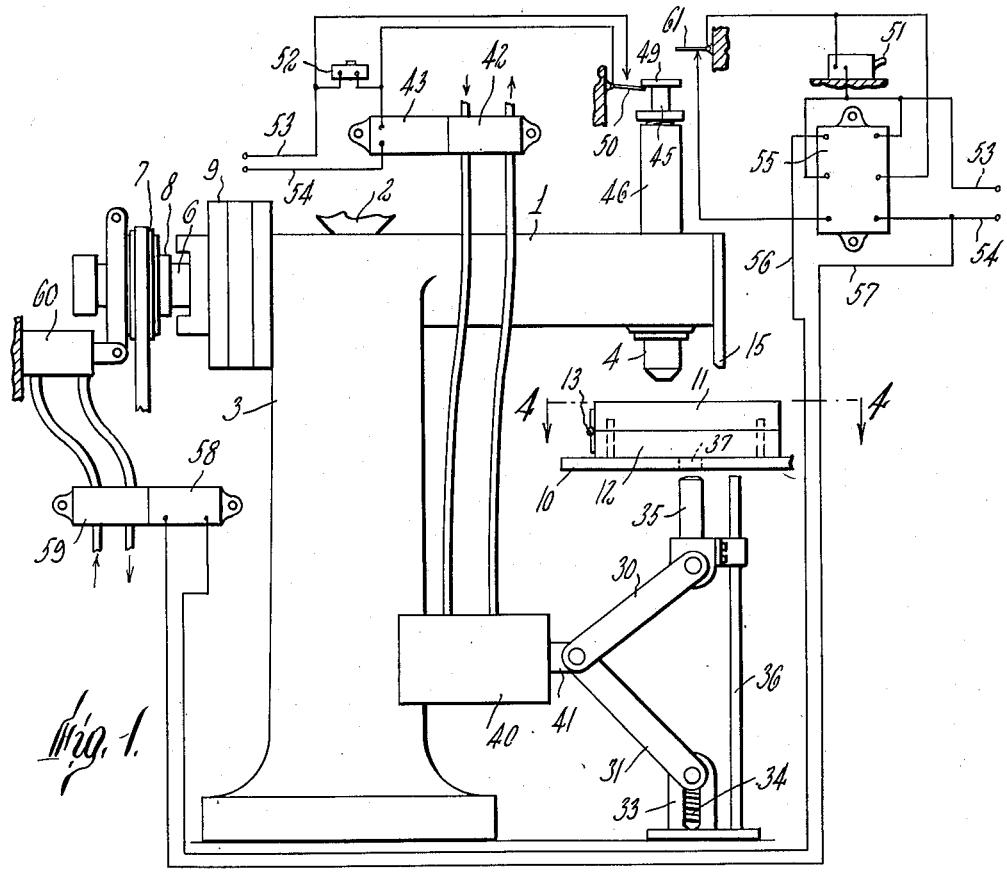

Referring first to Figure 1, there is shown somewhat diagrammatically a container 1 for plastic material having a supply hopper 2 for introduction of plastic at one end, and supported on a suitable stand 3 in elevated position. This container is provided on its under face near to the opposite end with a nozzle 4 through which material may be forced out from the container and into the mold.

As shown best in Figure 3, the container 1 is tubular and carries journaled therein a coarse pitch screw 5 carried by a shaft 6 which projects at its rear end through the rear end of the container 1 where it may carry any suitable form of driving means, such as a belt pulley 7, over which passes a belt leading to a one-direction motor. A clutch of any suitable type at 8 and closed by the fluid actuated clutch operator 60 may be employed to clutch the pulley 7 into driving relation to the shaft 6, or to release the shaft therefrom. At 9 is positioned a suitable thrust bearing to take the thrust imparted by the material within the container 1 during rotation of the screw 5, which is rotated in the direction to force the plastic material within the tube 1 toward the nozzle 4 and out therefrom.

The plastic material commonly is of a type which may be softened by heating and where such a plastic is employed, the container 1 may be heated by any suitable means, such, for example, as an electrical coil placed therearound, or a circulating means for heating oil, or any other known means by which the desired temperature may be maintained.

Beneath the nozzle 4 is positioned a suitable carrier such as a conveyor, or the like, and herein shown as a rotary table 10 on which may be supported a series of molds. As shown, each of these molds is made in two parts 11 and 12, which may be hinged together at 13, and the top section 11 of each mold is provided with a mouth 14 which may be presented to the nozzle 4. The container 1, as shown, also carries an abutment 15 which with the nozzle defines a position for each of the molds wherein the mouth 14 is presented tightly against the lower end of the nozzle 4 so as to prevent escape of the plastic material therebetween. The two parts 11 and 12 of the mold define between them a molding cavity 16 of the desired shape and this molding cavity may, if desired, be arranged to receive inserts which it may be desired to be molded into the molded article. For example, as shown in Figure 5, the terminal inserts 17 for an electrical cord, together with the conductors 18, may extend through the mold cavity so that in the molding operation a terminal plug 19 will be molded therearound, and in Figure 6 a strain-receiving element 20 is shown as molded upon the conductors 21, this strain-receiving element being molded with a peripheral groove 22 within which may be engaged a part such as a panel through which the conductors 21 are to be passed.

The mold members, as shown best in Figure 3, may be slidably supported on pins 25 suitably positioned in the table or conveyor 10 so that when the molds are lowered onto the table top they will be free from the nozzle 4 and may be moved therebeneath. While any of these molds is positioned properly beneath the nozzle, it may be lifted so as to clamp the two mold parts together and the top mold part 11 against the nozzle in position to receive the plastic material extruded through the nozzle. Any suitable means may be provided for moving the conveyor, such as the table 10, to present the molds successively into operative relation to the nozzle but such means per se form no part of the present invention, and are not herein shown.

Means for clamping the molds successively against the nozzle and the abutment 15, as shown, comprise a pair of toggle arms 30 and 31 (see Figure 1) hinged together at 32, the lower toggle arm being journaled in a supporting bracket 33, preferably against a spring 34 which will give a yielding pressure against the mold. The upper arm 30 is pivoted to a plunger 35 slidably guided vertically on a supporting post 36. The upper end of the plunger may extend through any of a series of openings 37 in the conveyor or table 10 and engage the mold thereabove substantially midway between the nozzle 4 and the abutment 15 and against the bottom face of the mold. Thus the toggle mechanism not only clamps the two parts of the mold together in proper relation, but clamps the upper portion of the mold with its mouth in position to receive the plastic extruded from the container 1. The toggle mechanism as shown may be actuated to make and break it through a fluid pressure cylinder 40 containing a suitable piston connected to a piston rod 41 engaging the toggle pivot 32. This fluid pressure motor mechanism may be actuated by a suitable valve shown at 42 which may be actuated in toggle making direction by energization of a solenoid 43 as will later appear.

A spring pressed plunger 45 slidably mounted with a cylinder 46 carried by the container 1 extends through the passage 47 which is in communication with the right hand end of the chamber 1. This plunger 45 has a reduced diameter portion 471 terminating in a conical valve 472 having a central stem 473 which makes a sliding fit within the nozzle 4 and completely fills this nozzle when the valve 472 is fully seated. The cross sectional area of the plunger 45 above the reduced diameter portion 471 is sufficiently greater than the cross sectional area of the part 471 so that when the valve 472 is seated, pressure of the plastic within the passage 47 produced by rotation of the screw 5 in feeding direction will be effective to raise the plunger and open the valve against the action of the spring 470 which reacts between a plug 48 threaded into the top of the cylinder 46 and through which the plunger 45 is slidable and a collar 450 secured to the plunger 45. This acts to raise a head 49 at the upper end of the plunger 45 to a point which allows a normally closed switch 50 to close.

Figure 2:
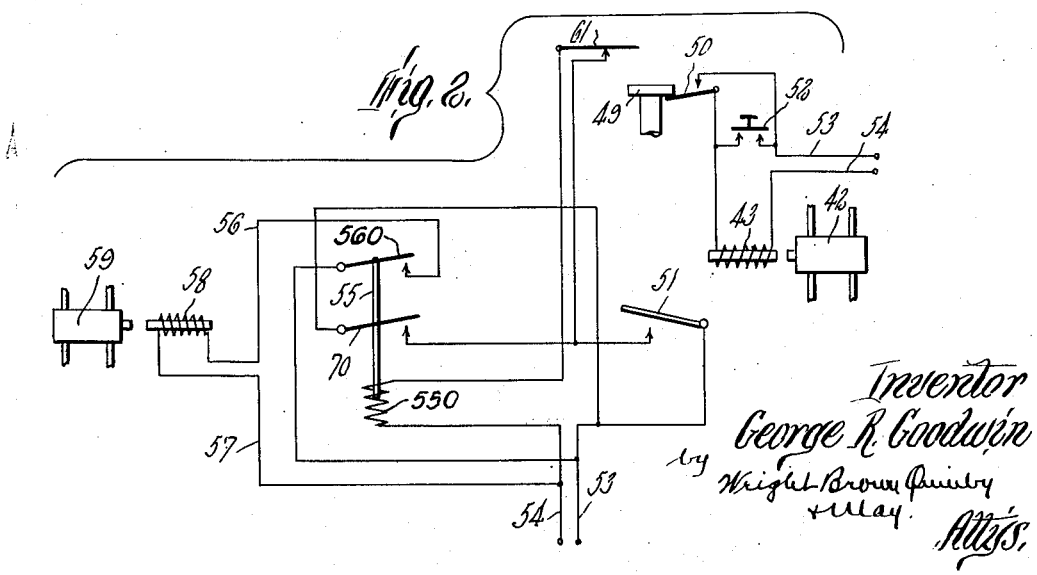
Figure 2 is a wiring diagram for the machine.

The solenoid-operated valve 42 is shown as energized by the closing of a normally open manually operated switch 52. When an empty mold is properly positioned beneath the nozzle 4, the operator closes the switch 52, energizing the solenoid 43 from the lines 53 and 54 which lifts the mold up into clamping relation and in position to receive the plastic extruded from the nozzle 4 thereinto. The operator then closes the clutch 8 by any suitable means, such, for example, as by closing the foot-actuated switch at 51. This closes a circuit from the lines 53 and 54 through the relay 55 closing coil 550 of the relay 55 and normally closed switch 61, which, in turn (see Figure 2), closes a circuit from the lines 53 and 54 through the leads 56 and 57 and switch 560 of the relay 55, through the solenoid valve 58 which controls the fluid pressure valve 59 in such relation as to actuate the fluid pressure cylinder 60 to close the clutch 8. This closing of the relay 55 also closes a holding circuit switch 70 in parallel with the foot-operated switch 51 and including the normally closed switch 61. The clutch 8 being now closed, shaft 6 is caused to rotate in a direction to cause the screw 5 to force the plastic material toward the nozzle 4 and out therefrom. It also causes an kneading action on the plastic which acts to thoroughly mix it, which is an important function of the screw 5 in addition to its function of feeding the plastic out through the nozzle and into the mold which is positioned beneath it. As this action takes place, the pressure exerted by the screw is transmitted to the plunger 45 which rises sufficiently to allow the switch 50 to close. This short circuits the hand actuated switch 52 which needs to be pressed only momentarily. When the mold has been filled the pressure against the plunger 45 rises further until the plunger head 49 contacts and opens the normally closed switch 61 and opens the circuit through the relay coil 550. This deenergizes the relay 55, and through opening of the relay switch 560 deenergizes the solenoid 58 and permits the clutch 8 to disengage. When the rotation of the screw stops, the pressure exerted on the plastic material within the container drops rapidly as it flows backwardly between the convolutions of the screw conveyor. As this loss of pressure takes place, the plunger 45 descends until it reaches and opens the switch 50, deenergizing the solenoid 43 and causing the valve 42 to return to position where the fluid pressure cylinder 40 breaks the toggle 30 and 31 and lowers the filled mold from its position. This descent of the plunger 45 closes the valve 472 against its seat, shutting off the flow of plastic, and the stem 473 ejects the plastic from the nozzle beneath the valve seat so that there is no opportunity afforded for plastic at the nozzle to become congealed by contact of the nozzle with an unfilled and cold mold, which might clog the nozzle or pass a congealed slug of plastic into the mold in the next molding operation and produce a blemish in the product. The conveyor or table is then turned to present an unfilled mold into position for subsequent operation and the filled mold is opened and the molded article removed therefrom. Any inserts which are desired to be placed are inserted in the empty mold before it reaches molding position.

While as shown no step by step drive for the conveyor or table 4 has been illustrated, it may, of course, be automatic, but as such mechanism is old and well known, it has not been illustrated herein.

This application is a continuation-in-part of my application Serial No. 219,599 filed April 6, 1951, now abandoned, for Extrusion Molding Machine.

From the foregoing description of an embodiment of this invention it should be evident to those skilled in the art that various changes and modifications may be made without departing from its spirit or scope.

I claim:

1. A molding machine comprising a nozzle through which material to be molded may be forced, a plurality of molds each having a mouth for presentation to said nozzle, said molds being mounted for motion to present said molds successively with their mouths in operative relation to said nozzle, means for clamping each mold with its mouth against said nozzle when in molding position, means forcing the molding material through said nozzle into a mold so clamped, an element movable in response to pressure within said nozzle, means actuated by motion of said element in response to increased pressure to a predetermined point to stop said forcing means when such mold becomes filled and means actuated by said element in response to decrease of pressure at said nozzle to a predetermined point after each forcing operation to release said clamp mold.

2. A molding machine comprising a nozzle, a plurality of molds beneath said nozzle each having a mouth and movable to successively present each mouth opposite to said nozzle, mechanism arranged to force the mold with its mouth opposite thereto up against said nozzle and for lowering said mold to separate said nozzle and mold to permit motion of said molds to move one mold out of said opposite position and to present another mold in said position, means for forcing moldable material out through said nozzle and through one of said mouths and into a mold when said nozzle and mold are forced together, a movable element responsive in position to the pressure of material at said nozzle, means actuated by movement of said element to a position corresponding to a predetermined high pressure of material at said nozzle to stop said forcing means, and means responsive to the position of said element corresponding to decrease of pressure at said nozzle to a predetermined point after a forcing operation to actuate said mechanism to separate said nozzle and mold preparatory to presenting another mold in operative relation to said nozzle.

3. In combination, a container for plastic material and having a discharge nozzle, means by which molds may be successively presented into operative relation to said nozzle to receive plastic material therefrom, means for imparting pressure to the material within said container when a mold is positioned to receive plastic material from said nozzle, a spring pressed plunger subjected to pressure from said material, and means responsive to the position of said plunger to remove pressure from said plastic when a predetermined pressure has been imparted thereto and to release a filled mold from presenting position and permit an unfilled mold to be moved into filling position when said plunger reaches a predetermined low pressure position.

4. In combination, a container for plastic material and having a discharge nozzle, means by which molds may be successively presented into operative relation to said nozzle to receive plastic material therefrom, means for imparting pressure to the material within said container when a mold is positioned to receive plastic material from said nozzle, a spring pressed plunger subjected to pressure from said material, and means responsive to the position of said plunger to remove pressure from said plastic when a predetermined pressure has been imparted thereto and to release a filled mold from presenting position and permit an unfilled mold to be moved into filling position when said plunger reaches a predetermined low pressure position, said plunger having a valve portion cooperating with said nozzle when said element is in said last mentioned position to close said nozzle against the passage of moldable materal therethrough.

5. In combination, a container for plastic material and having a discharge nozzle, means by which molds may be successively presented into operative relation to said nozzle to receive plastic material therefrom, means for imparting pressure to the material within said container when a mold is positioned to receive plastic material from said nozzle, a spring pressed plunger subjected to pressure from said material, means responsive to the position of said plunger to remove pressure from said plastic when a predetermined pressure has been imparted thereto and to release a filled mold from presenting position and permit an unfilled mold to be moved into filling position when said plunger reaches a predetermined low pressure position, said plunger having a valve portion cooperating with said nozzle when said element is in said last mentioned position to close said nozzle against the passage of moldable material therethrough, and a stem extending from said valve portion arranged to fill said discharge nozzle when said plunger is in said last mentioned position.

6. A molding machine comprising a nozzle through which material to be molded may be forced, a mold having a mouth for presentation to said nozzle, said machine having a passage leading to said nozzle, means for forcing plastic material through said passage to said nozzle, a valve for said nozzle, a plunger carrying said valve and extending through said passage, a spring acting on said plunger and tending to close said valve, said plunger having a cross sectional area larger than said valve and subjected to pressure in said passage in a direction to open said valve, and means actuated by opening motion of said plunger to a predetermined point to stop the operation of said forcing means.

7. A molding machine comprising a nozzle through which material to be molded may be forced, a mold having a mouth for presentation to said nozzle, said machine having a passage leading to said nozzle, means for forcing plastic material through said passage to said nozzle, a valve for said nozzle, a plunger carrying said valve and extending through said passage, a spring acting on said plunger and tending to close said valve, said plunger having a cross sectional area larger than said valve and subjected to pressure in said passage in a direction to open said valve, means actuated by opening motion of said plunger to a predetermined point to stop the operation of said forcing means, and means actuated by subsequent closing motion of said valve by said spring on drop of pressure in said passage for separating said mold from said nozzle.

8. A molding machine comprising a nozzle through which material to be molded may be forced, a mold having a mouth for presentation to said nozzle, said machine having a passage leading to said nozzle, means for forcing plastic material through said passage to said nozzle, a valve for said nozzle, a plunger carrying said valve and extending through said passage, a spring acting on said plunger and tending to close said valve, said plunger having a cross sectional area larger than said valve and subjected to pressure in said passage in a direction to open said valve, and means actuated by opening motion of said plunger to a predetermined point to stop the operation of said forcing means, said valve having a stem projecting into and filling said nozzle when said valve is closed.

GEORGE R. GOODWIN.

References Cited in the file of this patent

UNITED STATES PATENTS

| Number | Name | Date |
|---|---|---|
| 2,327,227 | Tucker | Aug. 17, 1943 |
| 2,351,774 | McGowen | June 20, 1944 |
| 2,372,833 | Jobst | Apr. 3, 1945 |
| 2,431,843 | Swoger | Dec. 2, 1947 |